United States Patent
Jia et al.

(10) Patent No.: US 10,552,049 B2
(45) Date of Patent: Feb. 4, 2020

(54) METHOD AND APPARATUS FOR MANAGING DATA ACCESS

(71) Applicant: EMC IP HOLDING COMPANY LLC, Hopkinton, MA (US)

(72) Inventors: Ruiyong Jia, Beijing (CN); Jian Gao, Beijing (CN); Lifeng Yang, Beijing (CN); Xu Xinlei, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/386,166

(22) Filed: Dec. 21, 2016

(65) Prior Publication Data

US 2017/0185318 A1 Jun. 29, 2017

(30) Foreign Application Priority Data

Dec. 29, 2015 (CN) .......................... 2015 1 1020927

(51) Int. Cl.
G06F 12/00 (2006.01)
G06F 3/06 (2006.01)

(52) U.S. Cl.
CPC ............ *G06F 3/0611* (2013.01); *G06F 3/064* (2013.01); *G06F 3/0622* (2013.01); *G06F 3/0647* (2013.01); *G06F 3/0659* (2013.01); *G06F 3/0667* (2013.01); *G06F 3/0673* (2013.01)

(58) Field of Classification Search
None
See application file for complete search history.

(56) References Cited

U.S. PATENT DOCUMENTS

| 9,135,123 | B1 | 9/2015 | Armangau et al. |
| 9,141,564 | B1 * | 9/2015 | Wieland ............... G06F 9/4416 |
| 9,645,932 | B1 | 5/2017 | Bono et al. |
| 9,934,163 | B1 | 4/2018 | Armangau et al. |
| 2004/0188710 | A1 * | 9/2004 | Koren .................. G11C 16/102 257/197 |
| 2009/0276604 | A1 * | 11/2009 | Baird .................. G06F 12/0653 711/206 |
| 2011/0029741 | A1 | 2/2011 | Kuo |
| 2016/0092108 | A1 * | 3/2016 | Karaje .................... G06F 3/061 718/103 |

FOREIGN PATENT DOCUMENTS

| CN | 1975655 | 6/2007 |
| CN | 104714756 | 6/2015 |
| CN | 104932831 | 9/2015 |

* cited by examiner

*Primary Examiner* — Jason W Blust
(74) *Attorney, Agent, or Firm* — BainwoodHuang

(57) ABSTRACT

A method and apparatus for managing data access comprises: receiving a write request for writing data into one or more storage blocks; in response to determining that a storage block is unavailable, writing a part of the data into a virtual storage block corresponding to the storage block, the part of the data being required to be written into the storage block; and in response to determining that the storage block becomes available, copying the part of the data from the virtual storage block to the storage block. The embodiments of the present disclosure further disclose a corresponding apparatus. By introducing the virtual storage blocks in the data access, the embodiments of the present disclosure can realize the parallel data transfers of a plurality of writes and thus greatly improve the data writing performance of the system.

20 Claims, 5 Drawing Sheets

METHOD AND APPARATUS FOR MANAGING DATA ACCESS

RELATED APPLICATIONS

This application claim priority from Chinese Patent Application Number CN201511020927.2, filed on Dec. 29, 2015 at the State Intellectual Property Office, China, titled "METHOD AND APPARATUS FOR MANAGING DATA ACCESS," the contents of which is herein incorporated by reference in its entirety.

FIELD

Embodiments of the present disclosure generally relate to the technical field of storage, and more specifically, relate to a method and apparatus for managing data access.

BACKGROUND

During processing of reading and/or writing data, the read and/or write operations may access a storage device. However, the storage device, such as a disk, a disk array, cache and etc., may usually have an IO with a low speed and thus the data copy may consume quite a long time. Meanwhile, in the scenario of data access, multi-user operations and multi-threaded applications are widely used. When the processes are paralleled, a lock is needed to control the implementation of serialization of the processes. All of these factors may result in the performance degradation of the data system.

In order to improve the serialized data access manner, one direct solution is to decrease the unit of disk management for example, so as to reduce the chance for a plurality of requests conflicting in a read/write operation. However, if the data to be read and/or written is small, the solution may be not scalable. In addition, the solution may greatly increase the consumption and management overhead of the storage device. Hence, there is a need to further optimize the existing data reading and/or writing performance.

SUMMARY

By introducing the concept of virtual storage blocks into the data write, the embodiments of the present disclosure propose a solution for optimizing performances of data accessing and writing operations to implement parallel data transfers of a plurality of writes.

According to a first aspect of the present disclosure, there is provided a method of managing data access, comprising: receiving a write request for writing data into one or more storage blocks; in response to determining that a storage block is unavailable, writing a part of the data into a virtual storage block corresponding to the storage block, the part of the data being required to be written into the storage block; and in response to determining that the storage block becomes available, copying the part of the data from the virtual storage block to the storage block.

In some embodiments, the method further comprises: obtaining, based on the write request, the one or more storage blocks in an order.

In some embodiments, the order includes an ascending or descending order of logical block addresses of the one or more storage blocks.

In some embodiments, the writing a part of the data into a virtual storage block corresponding to the storage block comprises: determining if each of the one or more storage blocks is available; in response to determining that a first storage block of the one or more storage blocks is available, locking the first storage block; in response to determining that a second storage block of the one or more storage blocks is unavailable, creating a first virtual storage block corresponding to the second storage block; creating a second virtual storage block corresponding to a third storage block of the one or more storage blocks, a following part of the data being required to be written into the third storage block; and writing the data into the first storage block and the first and second virtual storage blocks respectively.

In some embodiments, the copying the part of the data from the virtual storage block to the storage block comprises: locking the storage block for copying the part of the data from the virtual storage block to the storage block.

In some embodiments, the method further comprises: in response to the data being written into the one or more storage blocks, unlocking the one or more storage blocks.

In some embodiments, each of the one or more storage blocks includes a same number of logical pages.

In some embodiments, the writing a part of the data into a virtual storage block corresponding to the storage block comprises: creating the virtual storage block corresponding to the storage block; allocating, from a memory pool, a plurality of logical pages corresponding to a size of the virtual storage block; and writing the part of the data into the allocated plurality of logical pages.

In some embodiments, the copying the part of the data from the virtual storage block to the storage block comprises: redirecting the virtual storage block to the storage block; or merging the part of the data stored in the virtual storage block into the storage block.

According to a second aspect of the present disclosure, there is provided an apparatus for managing data access, comprising: a receiving unit configured to receive a write request for writing data into one or more storage blocks; and a data access control unit configured to in response to determining that a storage block is unavailable, write a part of the data into a virtual storage block corresponding to the storage block, the part of the data being required to be written into the storage block, and in response to determining that the storage block becomes available, copy the part of the data from the virtual storage block to the storage block.

In some embodiments, the data access control unit is further configured to: obtain, based on the write request, the one or more storage blocks in an order.

In some embodiments, the order includes an ascending or descending order of logical block addresses of the one or more storage blocks.

In some embodiments, the data access control unit is further configured to: determine if each of the one or more storage blocks is available; in response to determining that a first storage block of the one or more storage blocks is available, lock the first storage block; in response to determining that a second storage block of the one or more storage blocks is unavailable, create a first virtual storage block corresponding to the second storage block; create a second virtual storage block corresponding to a third storage block of the one or more storage blocks, a following part of the data being required to be written into the third storage block; and write the data into the first storage block and the first and second virtual storage blocks respectively.

In some embodiments, the data access control unit is further configured to, in response to determining that the storage block becomes available, lock the storage block; and copy the part of the data from the virtual storage block to the storage block.

In some embodiments, the data access control unit is further configured to: in response to the data being written into the one or more storage blocks, unlock the one or more storage blocks.

In some embodiments, each of the one or more storage blocks includes a same number of logical pages.

In some embodiments, the data access control unit is further configured to: create the virtual storage block corresponding to the storage block; allocate, from a memory pool, a plurality of logical pages corresponding to a size of the virtual storage block; and write the part of the data into the allocated plurality of logical pages.

In some embodiments, the data access control unit is further configured to: redirect the virtual storage block to the storage block; or merge the part of the data stored in the virtual storage block into the storage block.

According to a third aspect of the present disclosure, there is provided a computer readable storage media comprising computer readable program instructions stored thereon, the computer readable program instructions being used to perform the method of managing data access according to the embodiments of the disclosure.

According to a fourth aspect of the present disclosure, there is provided a storage system, comprising an apparatus for managing data access according to the embodiments of the disclosure.

By introducing the virtual storage blocks into the data access, the parallel data transfers of a plurality of writes can be achieved. Because the most time-consuming parts of a write are implemented in parallel, the data writing performance can be greatly improved. Further, by proposing a new solution for locking data, the embodiments of the present disclosure can further avoid dead lock that possibly occurs.

BRIEF DESCRIPTION OF THE DRAWINGS

With reference to the accompanying drawings, the non-restrictive embodiments are detailed to facilitate better understanding of the embodiments of the present disclosure, and other objectives, details, features and advantages of the embodiments of the present disclosure will become more apparent. In the drawings.

DETAILED DESCRIPTION OF THE EMBODIMENTS

Figure 1:
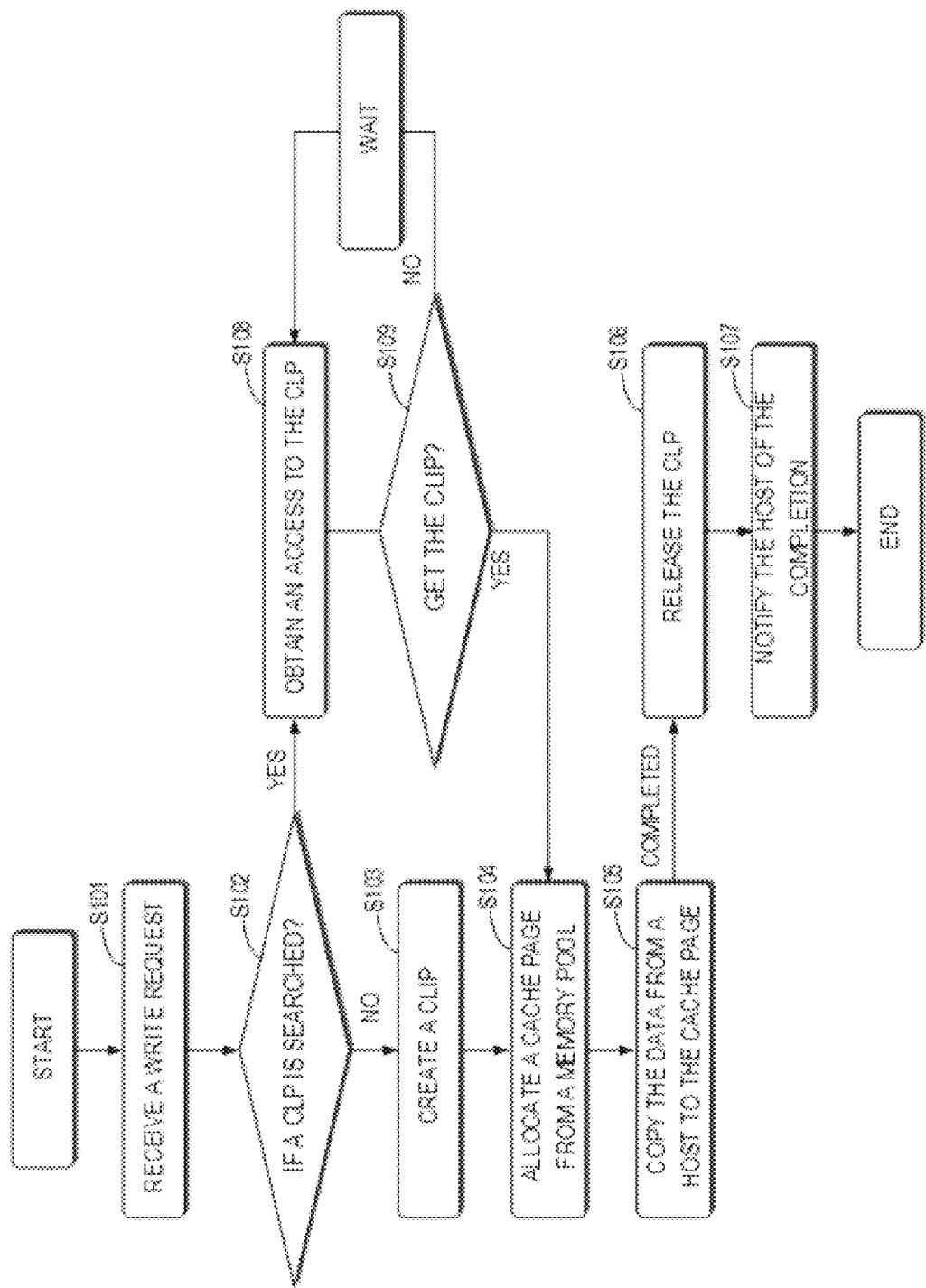
FIG. 1 illustrates a typical IO flow of a single write.

Embodiments of the present disclosure are detailed with reference to the drawings. The accompanying drawings exemplarily illustrate particular embodiments that are capable of realizing the present disclosure, and the exemplary embodiments are not intended to exhaust all of the embodiments of the present disclosure. Those skilled in the art may obtain alternative embodiments from the following descriptions or make structural or logical modifications thereto without departing from the spirits and the protection scope of the embodiments of the present disclosure. Hence, the following detailed descriptions are not restrictive, and the scope of the embodiments of the present disclosure is defined by the appended claims. It should be noted that, although steps of the relevant method of the embodiments of the present disclosure are described in a particular sequence in the drawings, this does not mean or hint that these operations should be performed according to the particular sequence, or all of the shown operations must be implemented in order to produce the desired results. In the contrary, the steps described herein may be implemented in different sequences. Additionally or alternatively, some steps may be omitted, multiple steps may be combined into one step, and/or one step may be decomposed into multiple steps.

As stated above, embodiments of the present disclosure intend to provide a solution for optimizing performance of data access. In different types of storage devices, due to the fast running speed, the cache is capable of performing high-speed data, exchange and therefore is widely used, Specifically, for example, a large dynamic random memory (RAM) that is widely used in the data processing system can serve as data cache from or to a physical disk. However, writing data to the data cache may also exist the foregoing problems. For the sake of description, the cache is taken as an example of the storage media to detail the principles and spirits of the present disclosure. It should be appreciated that, on the basis of the prior arts and the common knowledge in the art, those skilled in the art would readily obtain how the data write according to the embodiments of the present disclosure accesses other storage media.

For the purpose of processing efficiency and, management convenience, a cache memory is conventionally divided into several fix-sized cache pages, e.g. 8k. A cache page may store a set of adjacent disk sectors and is the smallest management unit of the cache memory. A cache logical page (CLP) may consist of multiple cache pages (e.g. 8) for storing larger pieces of continuous disk data. CLP is a basic management unit of disk data, and it maintains mapping between the cache pages and the data on disks. In addition, CLP must also maintain some control information, besides the aforementioned memory to disk mapping. For example, in a disk array application, a disk array may usually have multiple controllers, and caches in different controllers must keep their data synchronized and consistent. When one of the controllers fails, caches in the rest controllers must ensure the data to be available. For example, in another case where the system is powered off, the cache must also guarantee the host acknowledged dirty data are not lost. Hence, considering multiple-threaded applications and parallel multiple-controller IOs, a CLP must be accessed exclusively when there is already one write using it. That is, it makes the CLP itself have the attribute of locking for a fix-sized disk LBA (logical block address) range.

When the applications are parallel sequential writes, theses writes would contend with one another if they are trying to access the same disk range managed by a same CLP. A CLP cannot be granted to other writes if a certain write is using it. In addition, in order to avoid possible dead lock, all the writes must obtain access to multiple CLPs in the same order, such as an ascending or descending LBA order.

In order to better understand the solution proposed in the present disclosure, a typical IO flow of a single write for a specific application scenario is described hereinafter with reference to FIG. 1. In the scenario, multiple controllers may operate a disk array, each of which may have a cache memory, and the cache memory is used for performing data storage exchange between the host and the disk array.

In S101, the cache memory receives a write request. The write request may directly come from a host or an upper layer drive, such as a virtual LUN drive, and the write request may comprise information associated with the data write, such as a disk volume number like an LUN serial number, a starting LBA, a data size and etc.

In S102, CLPs into which the data is to be written are searched in a page table based on the starting LBA and the data size, and it is determined whether a CLP is hit. The page table maintains mappings between the CLPs and the cache pages, and further includes mappings between LBAs and CLPs. In some embodiments, it can be realized for example in a form of a Hash table. In this step, the write tries to find the desired CLP based on the write request.

In S103, if the CLP is not hit, the host creates a corresponding CLP, the data write obtains an exclusive permission to access the newly created CLP, and the write may lock the CLP.

If the CLP is hit, the data is to be written into the CLP. The write tries to obtain an access to the CLP in S108 and determines whether the CLP can be obtained. If it is determined that the CLP is busy, the write cannot obtain the access to the CLP and have to wait until the CLP becomes available. If it is determined in S109 that no other writes are using the CLP, it means that the write can get and lock the CLP, and perform the access and write the data. Then, the process proceeds to S104.

In the following S104, after obtaining the access to the CLP, a cache page may be allocated from a memory pool. Then, in step S105, the data is copied from a buffer in the host or the upper layer drive to the cache page, thereby the data being written into the cache memory. It should be noted that the data will be mirrored to the cache memories of other controllers (if any).

Subsequently, in S106, the CLP is released after completing the data transfer. That is, the CLP is unlocked. In S107, the host or the upper layer drive is notified of the completion of the write.

It should be noted that the above descriptions are directed to a flow illustration of the write to one CLP related to the write request. However, according to one embodiment of the disclosure, when the write involves a plurality of CLPs, accesses to the plurality of CLPs may be obtained, one by one. That is, a plurality of CLPs can be locked and then the data is written into the plurality of CLPs. Moreover, as mentioned above, the write may conventionally obtain the accesses to the plurality of CLPs in a same order, e.g. the ascending or descending LBA order.

From the analysis on the IO flow of a single write, it can be found that, in the worst case, the traditional method may cause a chained dependency among multiple writes which may severely degrade the performance. For example, write 1 may hold CLP1 and CLP2, write 2 may hold CLP3 and still want to access CLP2, write 3 may hold CLP4 and still want to access CLP3 and so on. As a result, all of the writes have to be completely serialized. It can be further obtained that, the most time-consuming step is the data copy (S105) if the write need not wait for obtaining the access to the CLP. Because the data copy may spend most of the IO time, paralleling the data copies of different writes contending for a same CLP can bring the best performance promotion based on Amdahl's law.

Based on the foregoing, a concept of virtual storage block is introduced in one embodiment of the present disclosure, the virtual storage block is temporarily allocated, which may provide a temporary buffer to memorize the host data during the data copy. The virtual storage block will be released after the data is transferred to the real storage block.

Figure 2:
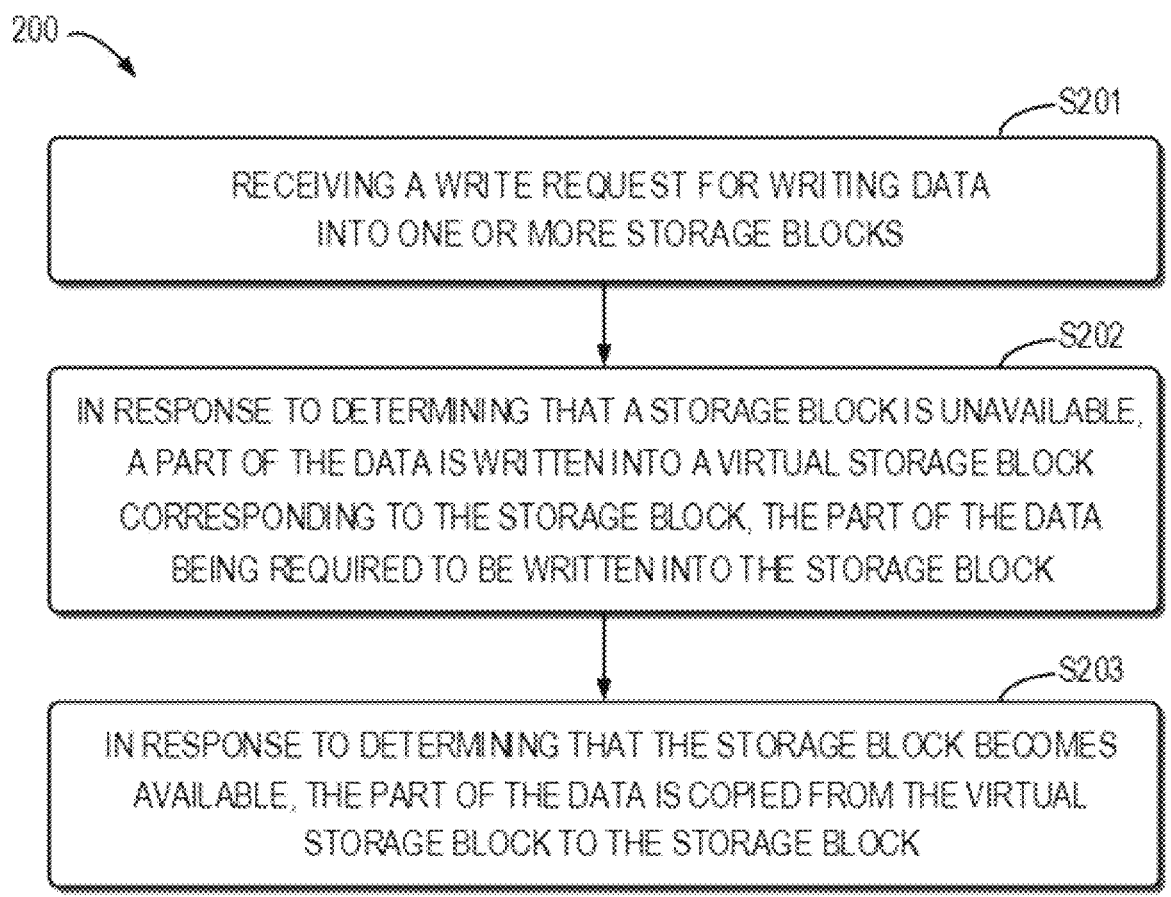
FIG. 2 illustrates a flow chart of a method of managing data access according to embodiments of the present disclosure.

FIG. 2 illustrates a flow chart of a method of managing data access according to one embodiment of the present disclosure. The embodiment of the present disclosure as shown in FIG. 2 is detailed hereinafter.

In S201, a write request for writing data into one or more storage blocks is received. That is, the request involves data to be written into one or more storage blocks. A storage block herein may be any appropriate storage management unit, such as a logical page and etc.

In S202, in response to determining that a storage block is unavailable, a part of the data is written into a virtual storage block corresponding to the storage block, the part of the data being required to be written into the storage block. In this step, for a storage block to be written based on the requirement of the write request, it is determined whether the storage block is available, i.e., whether the storage block is locked by other writes. In response to determining that the storage block is not available and failing to obtain the lock for the access to the storage block, a virtual storage block corresponding to the storage block can be created and the corresponding part of the data is written into the virtual storage block.

In S203, in response to determining that the storage block becomes available, the part of the data is copied from the virtual storage block to the storage block. In this step, it is determined whether the unavailable storage block becomes available. The storage block is locked in response to determining that it becomes available, and the part of the data stored in the virtual storage block is copied to the storage block.

It can be seen that, the solution of the present disclosure can realize the parallel data transfers of a plurality of writes and remarkably improve the system performance. For better understanding, the write to a cache memory is described hereinafter as an example.

According to one embodiment of the present disclosure, the concept of virtual CLP is introduced, and correspondingly, the CLP that finally holds the host data is called as the real CLP. When a write fails to access a real CLP, a virtual CLP is created to manage the same disk range as the real CLP. Then, cache pages are allocated for this virtual CLP and the data transfer is initiated from the host or upper layer driver. Therefore, the writes contending for the same real CLP can parallel their data transfer. After the data transfer is completed, the write using the virtual CLP may try to obtain the corresponding real CLP. Once it succeeds, the write may redirect the virtual cache page to the real CLP or merge the virtual cache page into the real CLP. Finally, the write may release the real CLP and notify the host or the upper layer of that the write is completed.

Figure 3:
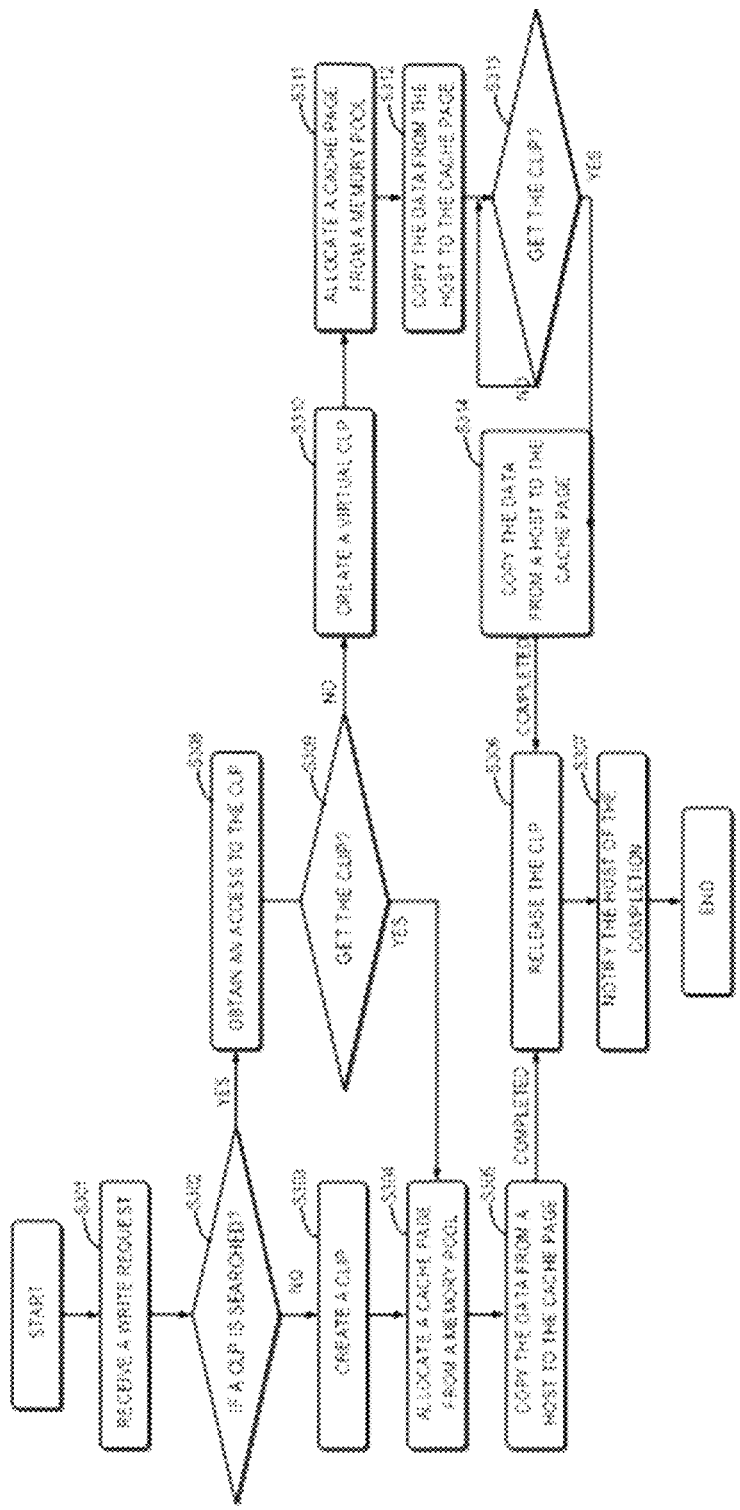
FIG. 3 illustrates an IO flow of a single write according to embodiments of the present disclosure.

FIG. 3 illustrates an IO flow of a single write according to one embodiment of the present disclosure. An IO flow of a single write according to one embodiment of the present disclosure will be described as follows. However, the similar steps to those of the IO flow of a single write as shown in FIG. 1 will be briefly illustrated hereinafter.

Figure 5:
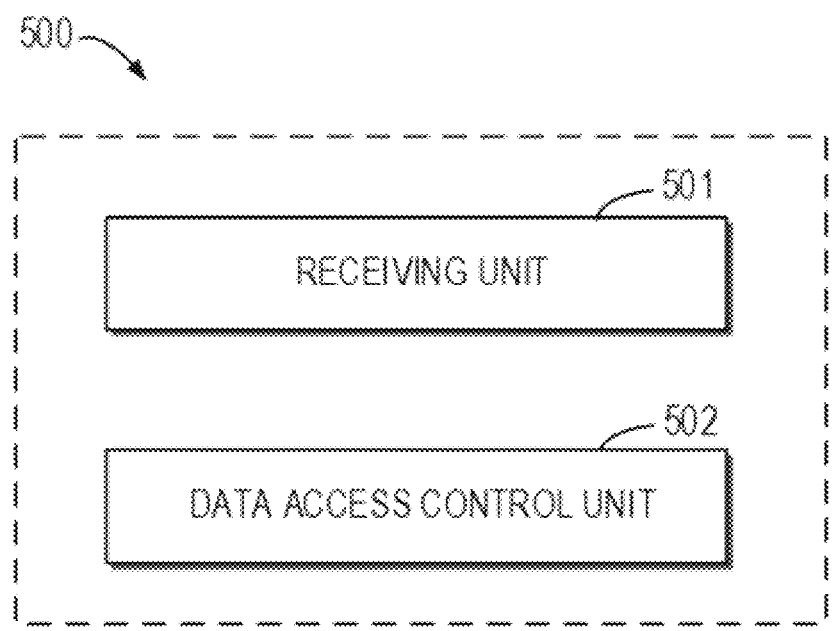
FIG. 5 illustrates a schematic diagram of an apparatus for managing data access according to embodiments of the present disclosure.

Steps S301 to S305 are similar to S101 to S105 in FIG. 5. In these steps, the cache memory receives a write request, and the write request may directly come from a host or an upper layer drive, such as a virtual LUN drives. CLPs into which the data is to be written are searched in a page table based on the starting LBA and the data size, and it is determined whether a CLP is hit. If the CLP is not hit, the host creates a corresponding CLP, the data write obtains an exclusive permission to access the newly created CLP, and the write may lock the CLP. Then, after obtaining the access to the CLP, a cache page may be allocated from a memory pool, and the data is copied from a buffer in the host or the upper layer drive to the cache page, thereby the data being written into the cache memory. It should be noted that the data will be mirrored to the cache memories of other controllers.

Likewise, if the CLP is hit, the data is to be written into the CLP. The write tries to obtain an access to the CLP in S308 and determines whether the CLP can be obtained in S309. If it is determined in S309 that no other writes are using the CLP, it means that the write can get and lock the CLP, and perform the access and write the data. Then, the process proceeds to S104 and the following steps.

If the CLP is determined to be busy in S309 and the write cannot obtain the access to the CLP, a virtual CLP is created in S310, which corresponds to the real CLP and manages the same disk range. In S311, a cache page is allocated from the memory pool to the virtual CLP, and in S312, the data is copied from the buffer in the host or the upper layer drive to the cache page corresponding to the virtual CLP.

In S313, it is determined whether the real CLP can be obtained to lock. In an actual implementation, according to one embodiment of the present disclosure, for example a waiting queue for the write requests and the corresponding CLPs may be created. The determining operation in S313 is triggered immediately upon obtaining the locking of a certain CLP. In view of the prior art and the common knowledge in the art, those skilled in the art may use any other appropriate implementations to trigger S313.

In response to determining that the locking of the real CLP can be obtained, the process proceeds to S314. In S314, the data in the virtual CLP page are moved/merged into the real CLP. The step only relates to the data transfer within a same storage media and thus may have a higher efficiency than the data write. In the meantime, according to one embodiment of the present disclosure, when the data written into the virtual CLP can be transferred as a whole, it is only needed to point the virtual CLP to the position of the real CLP without performing the actual data transfer.

After the data transfer required by the write request is completed, i.e., the steps 305 and 314 are completed, the real CLP may be released in S306. That is, the real CLP is unlocked, and the host or the upper layer drive is notified of that the write is completed in S307.

It should be noted that, the above descriptions are directed to a flow illustration of the write to one CLP related to the write request. However, according to one embodiment of the present disclosure, when the write involves a plurality of CLPs, accesses to the plurality of CLPs may be obtained one by one. That is, accesses to all of the real or virtual CLPs required by the write request can be obtained and then the data is written into the plurality of CLPs. Besides, as stated above, the write may conventionally obtain the accesses to the plurality of CLPs in a same order, e.g. the ascending or descending LBA order. It should be appreciated that those skilled in the art may control a single write to access the required CLP in any other appropriate manners.

It can be obtained from the above descriptions that, the step of copying data to the storage media enables the parallelization of a plurality of writes according to one embodiment of the present disclosure. For example, for a write, when S305 and S312 is being performed, other writes even contending for the same CLP can also perform their data transfers. Therefore, the parallel data transfers of a plurality of writes can be implemented. Additionally, S314 is only a process of moving data from the virtual CLP to the real CLP, which is a faster manner of data transfer.

Figure 4:
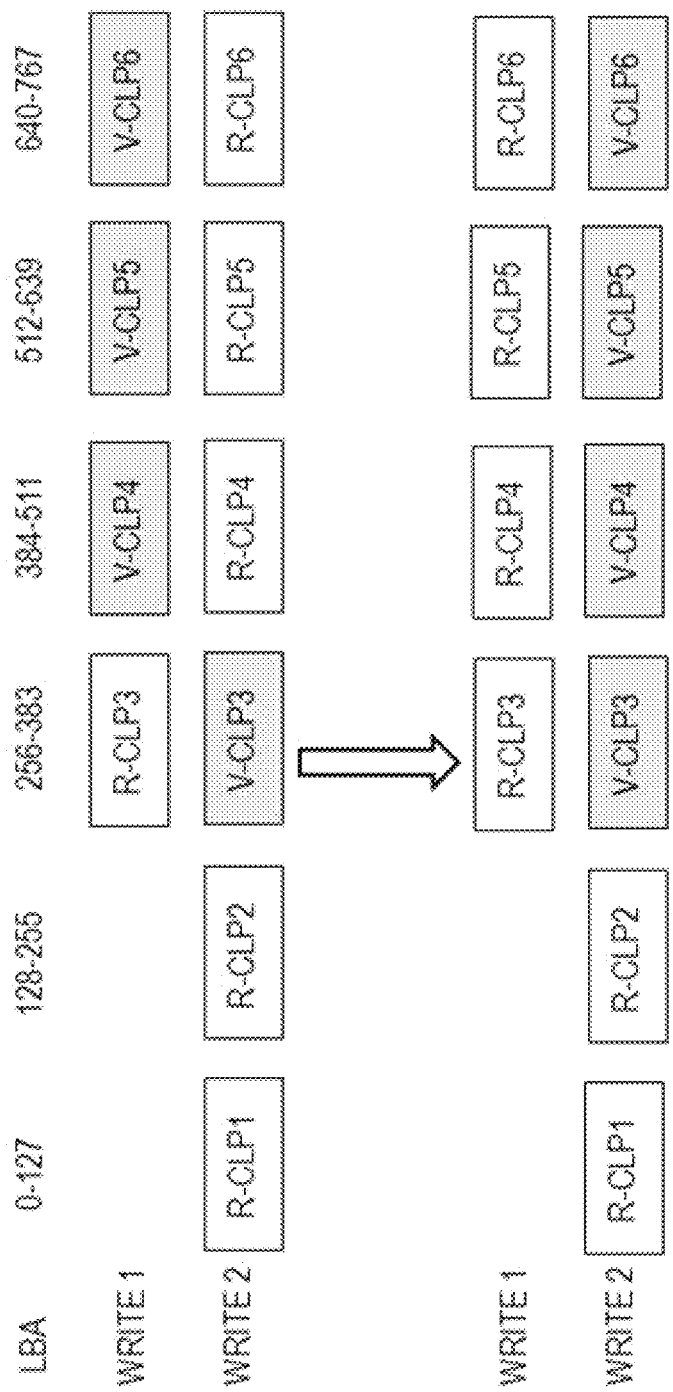
FIG. 4 illustrates a schematic diagram of a method for avoiding dead lock according to embodiments of the present disclosure.

As stated above, when the write accesses a plurality of real CLPs, the write may usually obtain all of the CLPs in an ascending or descending LBA order for example, so as to avoid possible dead lock with other writes that need to obtain the same CLPs. With the introduction of the virtual CLP, the dead lock between the plurality of CLPs may still happen. FIG. 4 will be described as an example hereinafter.

FIG. 4 illustrates a schematic diagram of a method for avoiding dead lock according to one embodiment of the present disclosure. Firstly, the upper part of FIG. 4 illustrates a possible dead lock situation between a plurality of writes. Suppose that there are two writes, namely write 1 and write 2, write 1 requires writing its data into the CLP3 through CLP6, write 2 requires writing its data into the CLP1 through CLP6, and the plurality of CLPs required by each write are continuous on the LBAs.

Suppose that write 2 has obtained accesses to the real CLP1 and CLP2 (R-CLP1 and R-CLP2), and at the same time, write 1 has obtained the real CLP3 (R-CLP3). According to the embodiments of the present disclosure, at, this time, because write 2 fails to obtain the locking of R-CLP3, a corresponding virtual CLP is created, namely V-CLP3. Write 2 continues to obtain the real CLP4 (R-CLP4). Then, because write 1 fails to obtain R-CLP4 which has been obtained by write 2, a corresponding virtual CLP is created, namely V-CLP4. Finally, write 2 obtains the real CLP5 and CLP6 (R-CLP5 and R-CLP6), and write 1 may use the virtual CLP5 and CLP 6 (V-CLP5 and V-CLP6). That is, as shown in FIG. 4, at this time, all of the CLPs are ready for the write 1 and write 2, and both of them begin to write their data into the respective real CLPs and virtual CLPs. Subsequently, write 2 tries to obtain the access to R-CLP3, and write 1 tries to obtain the access to R-CLP4. In such a case, dead lock between a plurality of writes may occur.

According to one embodiment of the present disclosure, in order to avoid the possible dead lock, the following method can be employed. If the write cannot obtain the access to the real CLP, even though it can obtain accesses to some of the following real CLPs, the write will still use the virtual CLPs for all of the following real CLPs. FIG. 4 describes such an example. Referring to the lower part of FIG. 4, because write 2 cannot obtain R-CLP3 (which is obtained by the write 1), the virtual CLPs may be used for the data that is needed to be written into the following CLPs. That is, write 2 may use V-CLP3 through V-CLP6. For write 1, because it can obtain the needed real CLP, it may use R-CLP3 through R-CLP6. It is seen that the dead lock as shown in FIG. 4 will not occur if the proposed new solution for locking is employed, because write 2 will use the virtual CLPs instead of the R-CLP3 through R-CLP6 if it cannot obtain the access to the R-CLP3.

It should be understood that FIG. 4 only shows an example of two writes, and those skilled in the art would readily envision applying the embodiments of the present disclosure into the situation with a plurality of writes.

FIG. 5 illustrates a schematic diagram of an apparatus for managing data access according to one embodiment of the present disclosure. According to the embodiment of the present disclosure, the apparatus for managing data access comprises: a receiving unit 501 configured to receive a write request for writing data into one or more storage blocks; and a data access control unit 502 configured to in response to determining that a storage block is unavailable, writing a part of the data into a virtual storage block corresponding to the storage block, the part of the data being required to be written into the storage block, and in response to determining that the storage block becomes available, copying the part of the data from the virtual storage block to the storage block.

In some embodiments, the data access control unit is further configured to: obtain, based on the write request, the one or more storage blocks in an order.

In some embodiments, the order includes an ascending or descending order of logical block addresses of the one or more storage blocks.

In some embodiments, the data access control unit is further configured to: determine if each of the one or more storage blocks is available; in response to determining that a first storage block of the one or more storage blocks is available, lock the first storage block; in response to determining that a second storage block of the one or more storage blocks is unavailable, create a first virtual storage block corresponding to the second storage block; create a second virtual storage block corresponding to a third storage block of the one or more storage blocks, a following part of the data being required to be written into the third storage block; and write the data into the first storage block and the first and second virtual storage blocks respectively.

In some embodiments, the data access control unit is further configured to, in response to determining that the storage block becomes available, lock the storage block; and copy the part of the data from the virtual storage block to the storage block.

In some embodiments, the data access control unit is further configured to: in response to the data being written into the one or more storage blocks, unlock the one or more storage blocks.

In some embodiments, each of the one or more storage blocks includes a same number of logical pages.

In some embodiments, the data access control unit is further configured to: create the virtual storage block corresponding to the storage block; allocate, from a memory pool, a plurality of logical pages corresponding to a size of the virtual storage block; and write the part of the data into the allocated plurality of logical pages.

In some embodiments, the data access control unit is further configured to: redirect the virtual storage block to the storage block; or merge the part of the data stored in the virtual storage block into the storage block.

According to the embodiments of the present disclosure, there is also provided a computer readable storage media comprising computer readable program instructions stored thereon, the computer readable program instructions being used to perform the method of managing data access according to the embodiments of the disclosure.

According to the embodiments of the present disclosure, there is also provided a storage system, comprising an apparatus for managing data access according to the embodiments of the disclosure.

By the foregoing descriptions and the teaching given in the relevant drawings, modifications and other embodiments of the present disclosure illustrated herein would be envisioned by those skilled in the art. Hence, it should be understood that the embodiments of the present disclosure are not limited to the specific embodiments of the present disclosure, and modifications and other embodiments are covered in the scope of the present disclosure. Moreover, though the foregoing description and the relevant drawings describe the exemplary embodiments in the background of certain exemplary combinations of the components and/or functions, it should be realized that different combinations of components and/or functions can be provided in alternative embodiments without departing from the range of the present disclosure. On the point, for example, other combinations of components and/or functions different than the above explicit description are anticipated to be within the range of the present disclosure. Despite the specific terms employed herein, they are only used with general and descriptive meanings without any intention to make limitation thereto.

For those skilled in the art, embodiments of the present disclosure are apparently not confined to details of the above exemplary embodiments, and can be implemented in other specific manners without departing from the spirits or essential features of the embodiments of the present disclosure. Consequently, all the embodiments should be viewed as being exemplary rather than restrictive. Obviously, the word "comprise" does not exclude other elements and steps, and the word "one" does not exclude plural numbers. A plurality of elements as recited in the apparatus claims may be replaced by one element.

What is claimed is:

1. A method of managing data access from a data storage system, comprising:
   receiving a write request for writing data into one or more storage blocks represented within a data cache;
   in response to determining that a storage block in the data cache is unavailable on account of the storage block being locked by another write of other data to the storage block, writing a part of the data into a virtual storage block in the data cache while the storage block remains unavailable, the virtual storage block corresponding to the storage block and composed of a set of uniformly-sized cache pages of the data cache, the part of the data being required to be written into the storage block; and
   in response to determining that the storage block becomes available, copying the part of the data from the virtual storage block to the storage block,
   the method thereby effecting a parallel write of data directed to the storage block by writing to the virtual storage block,
   wherein the method further comprises:
   receiving a first write request specifying a write of first data to a first range, the first range represented in the data cache by a first ordered series of storage blocks;
   receiving a second write request specifying a write of second data to a second range, the second range represented in the data cache by a second ordered series of storage blocks, the first ordered series of storage blocks at least partially overlapping the second ordered series of storage blocks and forming an ordered series of shared storage blocks;
   initiating processing in the data cache of the first write request and the second write request; and
   in response to encountering a locked storage block in the ordered series of shared storage blocks while processing the second write request, (i)creating a plurality of virtual storage blocks, including a virtual storage block for the locked storage block and for each storage block that follows it in the ordered series of shared storage blocks, and (ii) continuing to process the second write request by writing portions of the second data to the plurality of virtual storage blocks.

2. The method of claim 1, further comprising:
obtaining, based on the write request, the one or more storage blocks in an order.

3. The method of claim 2, wherein the order includes an ascending or descending order of logical block addresses of the one or more storage blocks.

4. The method of claim 2, wherein the writing a part of the data into a virtual storage block corresponding to the storage block comprises:
determining if each of the one or more storage blocks is available;
in response to determining that a first storage block of the one or more storage blocks is available, locking the first storage block;
in response to determining that a second storage block of the one or more storage blocks is unavailable, creating a first virtual storage block corresponding to the second storage block;
creating a second virtual storage block corresponding to a third storage block of the one or more storage blocks, a following part of the data being required to be written into the third storage block; and
writing the data into the first storage block and the first and second virtual storage blocks respectively.

5. The method of claim 1, wherein the copying the part of the data from the virtual storage block to the storage block comprises:
locking the storage block for copying the part of the data from the virtual storage block to the storage block.

6. The method of claim 1, further comprising:
in response to the data being written into the one or more storage blocks, unlocking the one or more storage blocks.

7. The method of claim 1, wherein each of the one or more storage blocks includes a same number of logical pages.

8. The method of claim 7, wherein the writing a part of the data into a virtual storage block corresponding to the storage block comprises:
creating the virtual storage block corresponding to the storage block;
allocating, from a memory pool, a plurality of logical pages corresponding to a size of the virtual storage block; and
writing the part of the data into the allocated plurality of logical pages.

9. The method of claim 1, wherein the copying the part of the data from the virtual storage block to the storage block comprises:
redirecting the virtual storage block to the storage block; or
merging the part of the data stored in the virtual storage block into the storage block.

10. An apparatus for managing data access to a data storage system, comprising:
a cache memory;
a disk array;
a receiving unit configured to receive a write request for writing data into one or more storage blocks of the cache memory configured to perform data storage exchange with the disk array; and
a data access control unit configured to:
in response to determining that a storage block in the cache memory is unavailable on account of the storage block being locked by another write of other data to the storage block, write a part of the data into a virtual storage block corresponding to the storage block and composed of a set of uniformly-sized cache pages of the data cache, the part of the data being required to be written into the storage block, and
in response to determining that the storage block becomes available, copy the part of the data from the virtual storage block to the storage block,
the data access control unit thereby effecting a parallel write of data directed to the storage block by writing to the virtual storage block,
the data access control unit further configured to;
receive a first write request specifying a write of first data to a first range, the first range represented in the data cache by a first ordered series of storage blocks;
receive a second write request specifying a write of second data to a second range, the second range represented in the data cache by a second ordered series of storage blocks, the first ordered series of storage blocks at least partially overlapping the second ordered series of storage blocks and forming an ordered series of shared storage blocks;
initiate processing in the data cache of the first write request and the second write request; and
in response to encountering a locked storage block in the ordered series of shared storage blocks while processing the second write request, (i) create a plurality of virtual storage blocks, including a virtual storage block for the locked storage block and for each storage block that follows it in the ordered series of shared storage, and (ii) continue to process the second write request by writing portions of the second data to the plurality of virtual storage blocks.

11. The apparatus of claim 10, wherein the data access control unit is further configured to:
obtain, based on the write request, the one or more storage blocks in an order.

12. The apparatus of claim 11, wherein the order includes an ascending or descending order of logical block addresses of the one or more storage blocks.

13. The apparatus of claim 11, wherein the data access control unit is further configured to:
determine if each of the one or more storage blocks is available;
in response to determining that a first storage block of the one or more storage blocks is available, lock the first storage block;
in response to determining that a second storage block of the one or more storage blocks is unavailable, create a first virtual storage block corresponding to the second storage block;
create a second virtual storage block corresponding to a third storage block of the one or more storage blocks, a following part of the data being required to be written into the third storage block; and
write the data into the first storage block and the first and second virtual storage blocks respectively.

14. The apparatus of claim 10, wherein the data access control unit is further configured to, in response to determining that the storage block becomes available, lock the storage block for copying the part of the data from the virtual storage block to the storage block.

15. The apparatus of claim 10, wherein the data access control unit is further configured to:
in response to the data being written into the one or more storage blocks, unlock the one or more storage blocks.

16. The apparatus of claim 10, wherein each of the one or more storage blocks includes a same number of logical pages.

17. The apparatus of claim 16, wherein the data access control unit is further configured to:
- create the virtual storage block corresponding to the storage block;
- allocate, from a memory pool, a plurality of logical pages corresponding to a size of the virtual storage block; and
- write the part of the data into the allocated plurality of logical pages.

18. The apparatus of claim 10, wherein the data access control unit is further configured to:
- redirect the virtual storage block to the storage block; or
- merge the part of the data stored in the virtual storage block into the storage block.

19. A computer program product for managing data access to a data storage system, the computer program product comprising:
- a non-transitory computer readable medium encoded with computer-executable code, the code configured to enable the execution of:
  - receiving a write request for writing data into one or more storage blocks represented within a data cache;
  - in response to determining that a storage block is unavailable on account of the storage block being locked by another write of other data to the storage block, writing a part of the data into a virtual storage block corresponding to the storage block and composed of a set of uniformly-sized cache pages of the data cache, the part of the data being required to be written into the storage block; and
  - in response to determining that the storage block becomes available, copying the part of the data from the virtual storage block to the storage block, the code thereby effecting a parallel write of data directed to the storage block by writing to the virtual storage block, wherein the code is further configured to enable the execution of:
- receive a first write request specifying a write of first data to a first range, the first range represented in the data cache by a first ordered series of storage blocks;
- receiving a second write request specifying a write of second data to a second range, the second range represented in the data cache by a second ordered series of storage blocks, the first ordered series of storage blocks at least partially overlapping the second ordered series of storage blocks and forming an ordered series of shared storage blocks;
- initiating processing in the data cache of the first write request and the second write request; and
- in response to encountering a locked storage block in the ordered series of shared storage blocks while processing the second write request, (i) creating a plurality storage blocks, including a virtual storage block for the locked storage block and for each storage that follows it in the ordered series of shared storage blocks, and (ii) continuing to process the second write request by writing portions of the second data to the plurality of virtual storage blocks.

20. The computer program product of claim 19, wherein the code is further configured to enable the execution of:
- obtaining, based on the write request, the one or more storage blocks in an order.

* * * * *